United States Patent
Irvin et al.

[11] Patent Number: 6,002,943
[45] Date of Patent: Dec. 14, 1999

[54] POWER LIMITING CIRCUIT FOR RADIO COMMUNICATION DEVICE WITH A RETRACTABLE ANTENNA

[75] Inventors: David R. Irvin, Raleigh; Ali S. Khayrallah, Apex, both of N.C.

[73] Assignee: Ericsson, Inc., Research Triangle Park, N.C.

[21] Appl. No.: 08/946,191

[22] Filed: Oct. 7, 1997

[51] Int. Cl.[6] .................................................. H04B 1/00
[52] U.S. Cl. .......................................... 455/522; 455/574
[58] Field of Search ........................... 455/90, 522, 550, 455/574, 575

[56] References Cited

U.S. PATENT DOCUMENTS 4,868,576  9/1989  Johnson, Jr. .
5,056,109  10/1991  Gilhousen et al. ...................... 455/522
5,321,738  7/1994  Ha ............................................ 455/575
5,374,937  12/1994  Tsunekawa et al. .
5,541,609  7/1996  Stutzman et al. .
5,815,820  9/1998  Kiem et al. .

*Primary Examiner*—Paul Loomis
*Attorney, Agent, or Firm*—Coats & Bennett, P.L.L.C.

[57] ABSTRACT

A power control circuit for a mobile radio communication device controls the transmit power level of the radio communication device based on the position of the antenna. The radio communication device comprises a transmitter and a retractable antenna coupled to the transmitter for transmitting radio signals. A sensor detects the position of the antenna. A power control circuit is responsive to a signal from the sensor to control the power level of the transmitter based on the position of the antenna.

10 Claims, 3 Drawing Sheets

POWER LIMITING CIRCUIT FOR RADIO COMMUNICATION DEVICE WITH A RETRACTABLE ANTENNA

FIELD OF THE INVENTION

The present invention relates generally to mobile radio communication devices having retractable antennas, and particularly, to a power control circuit for a mobile radio communication device for limiting transmit power when the antenna is in a retracted position.

BACKGROUND OF THE INVENTION

A typical mobile phone includes a retractable antenna which is extended during use, either before placing a call or after receiving a call. When waiting for a call, the antenna is usually placed in a retracted position. Therefore, the antenna must be operable in both the extended and retracted positions.

In designing antennas for mobile phones, it is desirable to match the impedance of the antenna to the impedance of the transceiver to maximize power transfer to the antenna. The patent Tsunekawa et al, U.S. Pat. No. 5,374,937 discloses a retractable antenna for a portable mobile phone with means for matching the impedance of the antenna to the impedance of the transceiver both when the antenna is extended and when the antenna is retracted. Keeping the antenna properly matched when retracted allows the phone's receiver to operate at the best possible efficiency under the circumstances, thereby enabling the phone to better detect incoming calls.

While it is possible to operate the phone with its antenna in a retracted position, it is not desirable. Even though the impedance of the retracted antenna can be matched, the radiation pattern of the retracted antenna may be perturbed by the phone's case and by the dielectric load of the user's hand, thereby limiting the transmission efficiency of the phone. In response to this decrease in radiation efficiency, the mobile phone's power control system will cause the phone to increase its transmission power. The net result will be harmless but unproductive dissipation of RF energy leading to early exhaustion of the phone's battery.

Accordingly, there is a need for a mobile phone with a retractable antenna which includes power control means for limiting power when the antenna is in a retracted position to prevent unnecessary dissipation of RF energy.

SUMMARY OF THE INVENTION

The present invention relates to power control for a radio communication device having a retractable antenna. The radio communication device includes a transmitter, a moveable antenna coupled to the transmitter for transmitting radio signals, a sensor for detecting the position of the antenna, and a power control circuit connected to the transmitter for controlling the transmit power level of the transmitter.

The sensor may comprise a switch contained within the housing of the radio communication device which is engaged by a switch actuator attached to the antenna. In this embodiment, the switch actuator engages the switch when the antenna is placed in either an extended or retracted position. The power control circuit operates the phone in either a normal mode or a reduced power mode depending upon the state of the switch. When in a normal mode, the transmitter may operate at a plurality of different power levels including a max.;mum transmit power level and a plurality of lesser power levels. When the radio communication device is operating in a reduced power mode, the power control circuit limits operation of the radio communication device to less than the maximum transmit power level of the transmitter. For example, if the radio communication device has eight power levels, the power control circuit may limit the operation of the radio communication device to the lower five power levels when it operates in a reduced power mode.

In a preferred embodiment of the invention, the power control circuit limits the transmit power level of the transmitter by modifying power control codes received at the radio communication device from a remote location. In a normal mode, the power control circuit sets the transmit power level according to power control codes received from the remote location. When operating in a reduced power mode, the power control codes which exceed a reduced power threshold are revised downward to a reduced maximum transmit power level.

Based on the foregoing, it is apparent that the present invention prevents the unnecessary dissipation of RF energy by limiting the transmit power level of the radio communication device when the antenna is in a retracted position. Further, since the present invention utilizes the power control circuits already present in radio communication devices, it can be easily incorporated into the system designs without a need for extensive redesign.

Other objects and advantages of the present invention will become apparent and obvious from a study of the following description and the accompanying drawings which are merely illustrative of such invention.

DETAILED DESCRIPTION OF THE INVENTION

Figure 1:
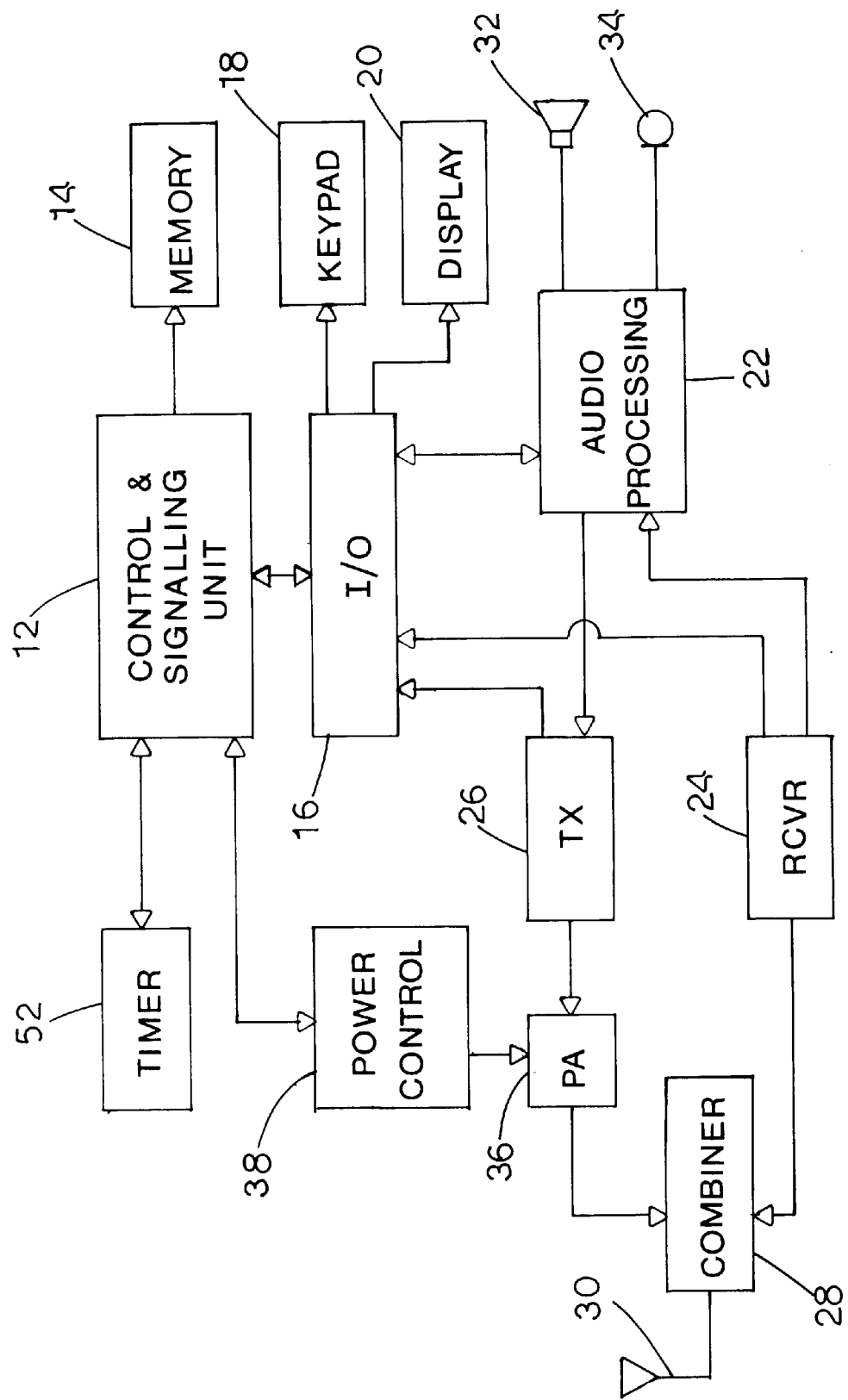
FIG. 1 is a block diagram of a mobile phone according to the present invention.

Referring now to the drawings, an improved hand-held mobile terminal 10 according to the present invention is shown. The hand-held mobile terminal 10 is a fully functional, battery powered, mobile transceiver capable of sending and receiving voice and/or data signals. The hand-held mobile terminal 10 may also be inserted into a cradle in a vehicle or connected to a docking station. The hand-held mobile terminal 10 of the present invention is an AMPS radio telephone.

As shown in FIG. 1, the mobile terminal 10 includes a control and signaling unit 12 for controlling the operation of the mobile terminal 10 and a program memory 14 for storing programs used by the mobile terminal 10. The control and signaling unit 12 is interfaced by input/output circuits 16 with a keypad 18, display 20, audio processing circuits 22, receiver 24, and transmitter 26. The keypad 18 and display 20 provide a user interface. The receiver 24 and transmitter 26 are coupled to an antenna 30 by combiner 28 so as to permit full duplex communication. The audio processing circuit 22 provides basic analog audio outputs to a speaker 32 and accepts analog audio inputs from a microphone 34. Received signals picked up by the antenna 30 are demodulated and decoded by the receiver 24. The transmitter 26 encodes and modulates signals passed to it by the audio processing circuits 22. The output of the transmitter 26 is amplified by a power amplifier 36 which is controlled by a power control unit 38. The power amplifier 36 and power control unit 38 determine the power level at which the signal is transmitted.

The control and signaling unit 12 performs most of the control functions of the mobile terminal 10. One of these functions is power control. The control and signaling unit 12 controls the transmit power level of the mobile terminal 10 in accordance with commands received from a base station. In the AMPS system used in North America, there are a total of 8 power levels. The base station determines the appropriate power level for the mobile terminal 10 based on strength and quality measurements of the signal received from the mobile terminal 10. The base station sends power control signals to the mobile terminal 10 using the slow Associated Content Channel (SACCH) or the Fast Associated Control Channel (FACCH). The control and signaling unit 12 then instructs the power control circuit 38 to set the transmit power level of the mobile terminal 10 at the designated power level. This mode is referred to herein as the normal mode.

The power control signals transmitted by the base station to the mobile terminal 10 are in the form of a mobile attenuation code (MAC). Table 1 below sets forth the MAC and power associated with each power level in the AMPS system for Class I, II, and III devices.

TABLE 1

Mobile Attenuation Codes for AMPS

| Power Level | MAC | Power For Class (in dbW) | | |
|---|---|---|---|---|
| | | Class I | Class II | Class III |
| 0 | 000 | 6 | 2 | −2 |
| 1 | 001 | 2 | 2 | −2 |
| 2 | 010 | −2 | −2 | −2 |
| 3 | 011 | −6 | −6 | −6 |
| 4 | 100 | −10 | −10 | −10 |
| 5 | 101 | −14 | −14 | −14 |
| 6 | 110 | −18 | −18 | −18 |
| 7 | 111 | −22 | −22 | −22 |

−2 dbW=0.631 Watts; 2 dbW=1.58 Watts; 6 dbW=3.98 Watts

When the mobile terminal 10 receives a power control signal from the base station, it sends instructions to the power control module 38 to adjust the transmit power accordingly. The power control module 38 includes a series of attenuators or other components for controlling the output of the power amplifier 36. The power amplifier 36 may be a single-stage amplifier or a multiple-stage amplifier. If a multiple-stage amplifier is used, the power control module 38 could include multiple bias adjustments and attenuators for controlling the output in each stage of the power amplifier 36. There are a wide variety of power amplifiers and controls which could be used and which are well known to those skilled in the art. Therefore, a detailed description of the power amplifier and power control is omitted.

Figure 2:
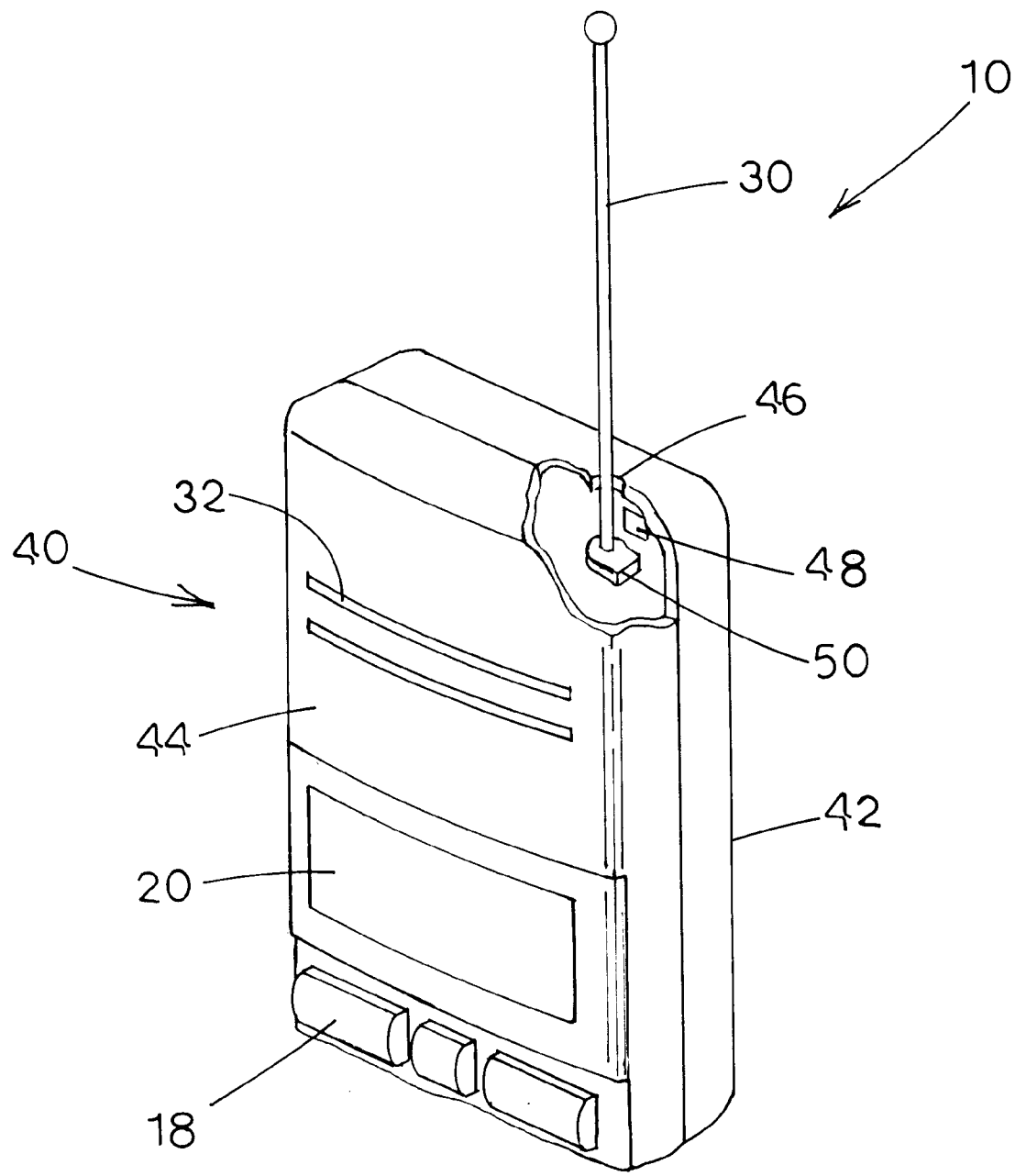
FIG. 2 is a partial perspective view of a mobile phone according to the present invention showing the antenna in an extended position.

Referring now to FIG. 2, there is shown a partial perspective view of a mobile terminal 10 of the present invention. The mobile terminal 10 includes a housing 40 rising a back cover 42 and front cover 44. The front cover 44 of the housing contains a key pad 18, display 20, sneaker 32 and microphone (not shown). The back cover 42 typically includes battery connections for a battery pack (not shown). An opening 46 is formed in the top of the housing 40 for the antenna 30. The antenna 30 extends through the opening in the housing and is movable between extended and retracted positions. The antenna 30 is coupled to the transmitter 26 and receiver 24 in a conventional manner to transmit and receive radio signals. If desired, an impedance matching circuit as described in U.S. Pat. No. 5,374,937 may be used to match the impedance of the antenna 30 to take transceiver in both its extended and retracted positions. The impedance matching circuit, however, is not considered to be part of the present invention.

In the present invention, position sensing means are provided for determining the position of the antenna 30. The position sensing means in the disclosed embodiment includes a switch 48 and a switch actuator 50. The switch 48 is disposed within the housing 40 adjacent the antenna 30. The switch actuator 50 is attached to the base of the antenna 30. When the antenna 30 is fully extended, the switch actuator 50 on the antenna 30 engages the switch 48. If the switch 48 is a normally open switch, then the switch actuator 50 would close the switch 48. Conversely, if the switch 48 is a normally closed switch, the switch actuator 50 would open the switch 48. In either case, the state of the switch 48 indicates whether the antenna 30 is in an extended position.

It will be apparent to those skilled in the art that the switch 48 can also be used to sense when the antenna 30 is in a retracted position. That is, the switch 48 and switch actuator 50 could be arranged such that the actuator 50 engages the switch 48 when the antenna 30 is in a retracted position. In this case, the state of the switch 48 would indicate whether the antenna 30 is in a retracted position rather than an extended position.

Although a switch 48 has been described as one means for determining the position of the antenna 30, those skilled in the art will recognize that a variety of position sensing means can be used. For example, optical sensors, inductive or capacitive sensors, proximity detectors, or any other known position sensing device can be used in the place of a mechanical switch. All that is necessary is that the sensor provide an indication of the position of the antenna. 30 In most instances, the sensor would indicate whether the antenna 30 is either a fully extended or fully retracted position. However, the sensor 30 could also indicate whether the antenna 30 is in a partially extended or partially retracted position.

The control signaling unit 12 monitors the state of the switch 48. When a call is established, the control and signaling unit 12 determines whether the antenna is extended, and, if not, starts a timer 52. If the antenna 30 is in a retracted position, an audible tone is generated or a warring message is displayed instructing the user to raise the antenna 30. If the antenna 30 is not raised by the time the timer 52 expires, the control and signaling unit 12 imposes a power cap on the transmit power of the mobile terminal 10 to prevent unnecessary waste of RF energy.

The present invention takes a vantage of power control circuits already present in the mobile terminal 10 to impose the power cap. As previously described, the mobile terminal 10 adjusts its transmit power according to mobile attenuation codes (MAC) received from a base station. There are a total of 8 power levels each identified by a three digit MAC code. When the antenna 30 is in a retracted position, the mobile terminal 10 imposes a power cap by revising the MAC code downward when necessary. This mode is referred to herein as the reduced power mode. For example, when the antenna 30 is down, the control and signaling unit 12 limits the phone's operation to MAC levels 5, 6 or 7 thereby capping its transmit power at 40 milliwafts maximum. If a mobile attenuation code for levels 0–4 is received, the control and signaling unit 12 revises the code downward to level 5. The mobile terminal 10 then adjusts its transmit power level in the normal manner according to the revised code. If the antenna 30 is extended while a call is in progress, the power cap is removed and the mobile terminal 10 operates in a normal manner.

Figure 3:
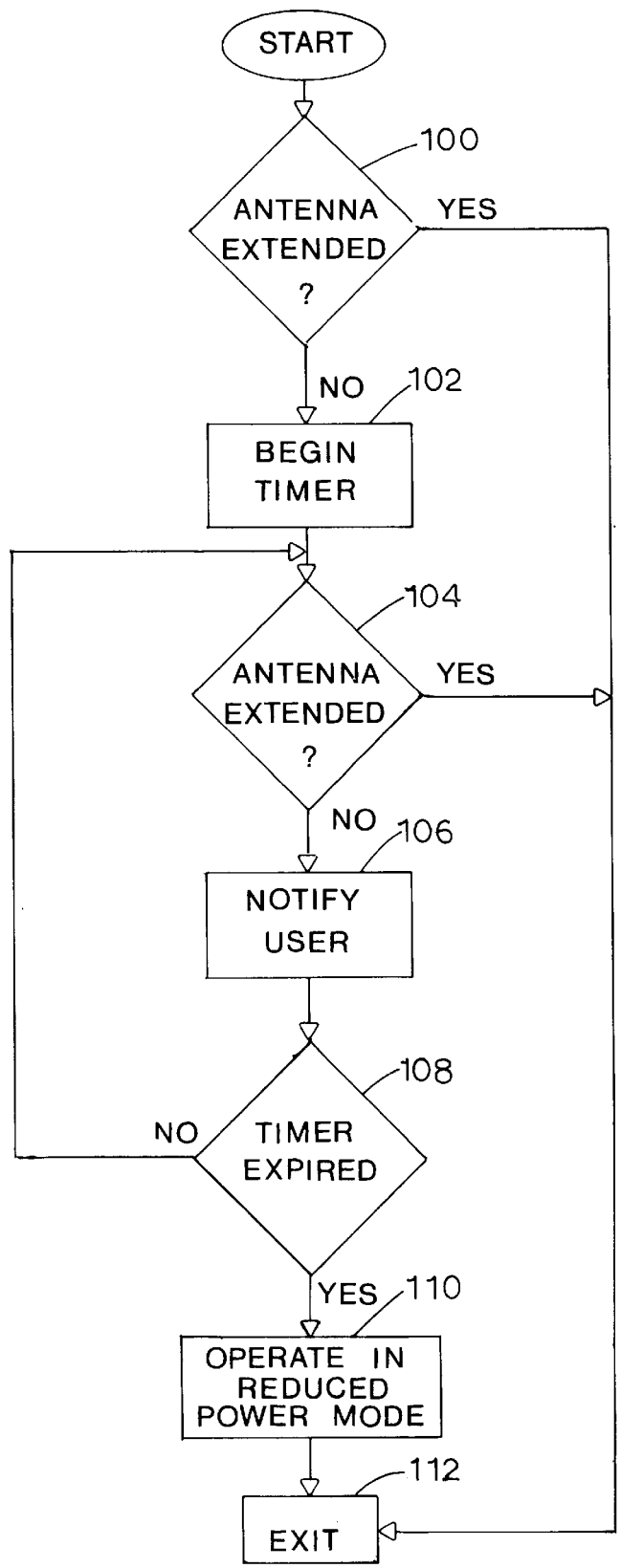
FIG. 3 is a flow diagram illustrating the operation of the mobile phone in accordance with the present invention.

FIG. 3 is a flow diagram illustrating the operation of the mobile terminal 10 according to the present invention. Once a call is established on a traffic channel, the control and signaling unit 12 checks whether the antenna 30 is in an extended position (block 100). If the antenna 30 is in the extended position, the control and signaling unit 12 exits the power control routine (block 112). if not, the control and signaling unit 12 starts a timer 52 (block 102) and then checks the status of the antenna 30 (block 104). If the antenna 30 is still in a retracted position, the control and signaling unit 12 instructs the user to extend the antenna 30 (block 106) and checks the status of its timer 52 periodically (block 108). If the timer 52 has not expired, the control and signaling unit 12 will again check the status of the antenna 30 (block 104) and issue a warning to the user (block 106) until either the antenna 30 is raised or until the timer 52 expires. If the antenna 30 is extended before the timer 52 expires, the power control routine is exited. Otherwise, the control and signaling unit 12 operates in a reduced power mode (block 110) until either the call ends or the antenna is extended. Once the antenna is extended, normal power control operation is restored.

By limiting power when the antenna 30 is in a retracted position, the present invention avoids unnecessary dissipation of RF energy which might otherwise exhaust the phone's batteries. An audible tone or other warning message notifies the user when the antenna 30 is in a retracted position so that the user can place the antenna 30 in an extended position allowing the phone to operate more efficiently.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A radio communication device comprising:
    a. a transmitter;
    b. a retractable antenna coupled to said transmitter for transmitting radio signals, said antenna being movable between extended and retracted positions;
    c. a sensor for sensing the position of the antenna;
    d. power control logic coupled to said transmitter and sensor for adjusting the transmit power of said transmitter based on power control codes received from a remote station, wherein said power control logic alters said power control codes when the antenna is in the retracted position and the power control code exceeds a predetermined maximum such that the maximum transmit power is limited while the antenna is in the retracted position.

2. The radio communication device according to claim 1 wherein the sensing means comprises a switch which is engaged by said antenna.

3. The radio communication device according to claim 2 wherein the switch is engaged by said antenna when said antenna is in an extended position.

4. The radio communication device according to claim 2 wherein the switch is engaged by said antenna when said antenna is in an retracted position.

5. The radio communication device according to claim 1 wherein said power control logic means is operative to alter the power control codes received from said remote location when the antenna is in a retracted position and the power control codes exceeds a predetermined maximum threshold.

6. In a radio communication device having a moveable antenna, a method of controlling the transmit power level of said radio communication device comprising:
    a. sensing the position of the antenna;
    b. receiving a power control code from a remote location;
    c. adjusting the transmit power of the transmitter according to the power control code received from the remote location;
    d. revising the power control code received from said remote location when the antenna is in the retracted position and the power control code exceeds a predetermined power level so that the maximum transmit power is limited while the antenna is in the retracted position.

7. The method according to claim 6 wherein the step of sensing the position of the antenna includes engaging a switch when the antenna is in a predetermined position.

8. The method according to claim 7 wherein the step of sensing the position of the antenna includes engaging a switch when the antenna is in an extended position.

9. The method according to claim 6 wherein the step of setting the maximum transmit power level includes reducing the maximum transmit power level when the antenna is not in an extended position.

10. The method according to claim 6 wherein the step of setting the maximum transmit power level includes altering the power control code received from said remote location when the antenna is in a retracted position and the code exceeds a predetermined power level, and setting the transmit power level according to the revised power control code.

* * * * *